(12) United States Patent
Baumgartner et al.

(10) Patent No.: US 8,009,782 B2
(45) Date of Patent: Aug. 30, 2011

(54) DOWNSCALING SYSTEM BANDWIDTH

(75) Inventors: Bernd Baumgartner, Giengen-Burgberg (DE); Frank Frederiksen, Klarup (DK); Martin Goldberg, Greifenberg (DE); Ulrich Rehfuess, Munich (DE); Sabine Rössel, Munich (DE); Ingo Viering, Munich (DE)

(73) Assignee: Nokia Siemens Networks Oy, Espoo (FI)

( * ) Notice: Subject to any disclaimer, the term of this patent is extended or adjusted under 35 U.S.C. 154(b) by 152 days.

(21) Appl. No.: 12/228,625

(22) Filed: Aug. 14, 2008

(65) Prior Publication Data

US 2009/0290597 A1 Nov. 26, 2009

Related U.S. Application Data

(60) Provisional application No. 61/128,341, filed on May 21, 2008.

(51) Int. Cl.
*H04B 1/10* (2006.01)
*H03K 9/06* (2006.01)
*H04J 3/00* (2006.01)

(52) U.S. Cl. ............ 375/351; 375/240; 370/468

(58) Field of Classification Search .......... 375/240, 375/240.18, 240.24, 343, 350, 351; 370/468, 370/465, 203, 208, 209, 210
See application file for complete search history.

(56) References Cited

U.S. PATENT DOCUMENTS

| 5,371,548 | A  | * | 12/1994 | Williams | 348/478 |
| 2005/0163194 | A1 | * | 7/2005 | Gore et al. | 375/132 |
| 2005/0254555 | A1 | * | 11/2005 | Teague | 375/136 |
| 2008/0186880 | A1 | * | 8/2008 | Seki et al. | 370/281 |
| 2008/0304588 | A1 | * | 12/2008 | Pi | 375/260 |

FOREIGN PATENT DOCUMENTS

| EP | 1819069 A2 | 8/2007 |
| EP | 1906686 A1 | 4/2008 |
| WO | WO-2007-045504 A1 | 4/2007 |

OTHER PUBLICATIONS

"3rd Generation Partnership Project; Technical Specification Group Radio Access Network; Evolved Universal Terrestrial Radio Access (E-UTRA); User Equipment (UE) radio transmission and reception (Release 8)", 3GPP TS 36.101 V8.1.0, (Mar. 2008), 43 pgs.

(Continued)

*Primary Examiner* — Hanh Nguyen
(74) *Attorney, Agent, or Firm* — Harrington & Smith

(57) ABSTRACT

A larger second bandwidth is fitted to a first transmission bandwidth by blanking PRBs at one or both edges of the larger second bandwidth. A first set of control channels is mapped to unblanked PRBs of the second bandwidth using a restricted set of physical cell identities that map only to the unblanked PRBs. A second control channel is punctured so that after it is interleaved and cyclically shifted the punctured CCEs fall on the blanked PRBs, and this second control channel is power compensated for the punctured CCEs. The first set and the second control channels are assigned in view of the puncturing and blanked PRBs, an IFFT for the larger second bandwidth is performed on a signal using zeros at the blanked PRBs, the signal is filtered to the first bandwidth and transmitted over a bandwidth not to exceed the first bandwidth.

20 Claims, 6 Drawing Sheets

OTHER PUBLICATIONS

"3rd Generation Partnership Project; Technical Specification Group Radio Access Network; Evolved Universal Terrestrial Radio Access (E-UTRA); Base Station (BS) radio transmission and reception (Release 8)", 3GPP TS 36.104 V8.1.0, (Mar. 2008), 52 pgs.

"3rd Generation Partnership Project; Technical Specification Group Radio Access Network; Evolved Universal Terrestrial Radio Access (E-UTRA); Multiplexing and channel coding (Release 8)", 3GPP TS 36.212 V8.3.0, (May 2008), 48 pgs.

"3rd Generation Partnership Project; Technical Specification Group Radio Access Network; Evolved Universal Terrestrial Radio Access (E-UTRA); Physical Channels and Modulation (Release 8)", 3GPP TS 36.211 V8.3.0 (May 2008), 77 pgs.

"3rd Generation Partnership Project; Technical Specification Group Radio Access Network; Evolved Universal Terrestrial Radio Access (E-UTRA); Physical layer procedures (Release 8)", 3GPP TS 36.213 V8.3.0 (May 2008), 45 pgs.

"3rd Generation Partnership Project; Technical Specification Group Radio Access Network; Evolved Universal Terrestrial Radio Access (E-UTRA); Radio Frequency (RF) system scenarios; (Release 8)", 3GPP TR 36.942 V1.2.0 (Jun. 2007), 68 pgs.

* cited by examiner

| PRB | 1st OFDM SYMBOL | 2nd | 3 | 4 | 5 | 6 | 7 | 8 | 9 | 10 | 11 | 12 | 13 | 14 |
|---|---|---|---|---|---|---|---|---|---|---|---|---|---|---|
| 14 | NIL | | | | | | | | | | | | | |
| 13 | PCFICH + PHICH | | | | | | | | | | | | | |
| 12 | PHICH | | | | | | | | | | | | | |
| 11 | PHICH | | | | | | | | | | | | | |
| 10 | NIL | | | | | | | | | | | | | |
| 9 | PCFICH | | | | | S-SYN | P-SYN | PBCH | PBCH | PBCH | PBCH | | | |
| 8 | PDCCH + PHICH | | | | | S-SYN | P-SYN | PBCH | PBCH | PBCH | PBCH | | | |
| 7 | PHICH | | | | | S-SYN | P-SYN | PBCH | PBCH | PBCH | PBCH | | | |
| 6 | PCFICH + PHICH | | | | | S-SYN | P-SYN | PBCH | PBCH | PBCH | PBCH | | | |
| 5 | NIL | | | | | S-SYN | P-SYN | PBCH | PBCH | PBCH | PBCH | | | |
| 4 | NIL | | | | | S-SYN | P-SYN | PBCH | PBCH | PBCH | PBCH | | | |
| 3 | PHICH | | | | | | | | | | | | | |
| 2 | PCFICH + PHICH | | | | | | | | | | | | | |
| 1 | PHICH | | | | | | | | | | | | | |
| 0 | PDCCH | | | | | | | | | | | | | |

FIG.1
PRIOR ART

TRANSMISSION BANDWIDTH CONFIGURATION $N_{RB}$ IN E-UTRA CHANNEL BANDWIDTHS

| CHANNEL BANDWIDTH $BW_{CHANNEL}$ [MHz] | 1.4 | 3 | 5 | 10 | 15 | 20 |
|---|---|---|---|---|---|---|
| TRANSMISSION BANDWIDTH CONFIGURATION $N_{RB}$ | 6 | 15 | 25 | 50 | 75 | 100 |

FIG.2
PRIOR ART

| | 1st OFDM SYMBOL | 2 | 3 | 4 | 5 | 6 |
|---|---|---|---|---|---|---|
| 24 | PDCCH + NIL | DUMMY | | | | |
| 23 | DUMMY | PDCCH + NIL | | | | |
| 22 | PDCCH | PDCCH + NIL | | | | |
| 21 | DUMMY | PDCCH + NIL | PHICH | | | |
| 20 | PCFICH + PDCCH | PDCCH + NIL | PHICH | | | |
| 19 | PDCCH | DUMMY | | | | |
| 18 | DUMMY | PDCCH+NIL | | | | S-SYN |
| 17 | PDCCH + NIL | PDCCH+NIL | | | | S-SYN |
| 16 | PDCCH + NIL | PDCCH+NIL | | | | S-SYN |
| 15 | DUMMY | PDCCH+NIL | | | | S-SYN |
| 14 | PDCCH + NIL | PDCCH+NIL | | | | S-SYN |
| 13 | PCFICH + PDCCH | PDCCH+NIL | | | | S-SYN |
| 12 | PHICH | PDCCH+NIL | | | | |
| 11 | PHICH | PDCCH+NIL | | | | |
| 10 | PDCCH | DUMMY | | | | |
| 9 | DUMMY | PDCCH+NIL | | | | |
| 8 | PDCCH | PDCCH+NIL | | | | |
| 7 | PCFICH + PDCCH | PDCCH+NIL | | | | |
| 6 | DUMMY | PHICH | | | | |
| 5 | PDCCH | PHICH+PDCCH+NIL | | | | |
| 4 | DUMMY | DUMMY | | | | |
| 3 | PDCCH + NIL | PDCCH+NIL | | | | |
| 2 | PDCCH | PDCCH+NIL | | | | |
| 1 | PCFICH + NIL | PDCCH+NIL | | | | |
| 0 | DUMMY | PDCCH+NIL | | | | |

FIG.5

| | 1stOFDM SYMBOL | 2 | 3 | 4 | 5 | 6 |
|---|---|---|---|---|---|---|
| 24 | PDCCH + NIL | DUMMY | | | | |
| 23 | DUMMY | PDCCH + NIL | | | | |
| 22 | PDCCH | PDCCH + NIL | | | | |
| 21 | DUMMY | PDCCH + NIL | PHICH | | | |
| 20 | PCFICH + PDCCH | PDCCH + NIL | PHICH | | | |
| 19 | PDCCH | DUMMY | | | | |
| 18 | DUMMY | PDCCH+NIL | | | | |
| 17 | PDCCH + NIL | PDCCH+NIL | | | | |
| 16 | PDCCH + NIL | PDCCH+NIL | | | | |
| 15 | DUMMY | PDCCH+NIL | | | | |
| 14 | PDCCH + NIL | PDCCH+NIL | | | | S-SYN |
| 13 | PCFICH + PDCCH | PDCCH+NIL | | | | S-SYN |
| 12 | PHICH | PDCCH+NIL | | | | S-SYN |
| 11 | PHICH | PDCCH+NIL | | | | S-SYN |
| 10 | PDCCH | DUMMY | | | | S-SYN |
| 9 | DUMMY | PDCCH+NIL | | | | S-SYN |
| 8 | PDCCH | PDCCH+NIL | | | | |
| 7 | PCFICH + PDCCH | PDCCH+NIL | | | | |
| 6 | DUMMY | PDCCH+NIL | | | | |
| 5 | PDCCH | PDCCH+NIL | | | | |
| 4 | DUMMY | PHICH | | | | |
| 3 | PDCCH + NIL | PHICH+PDCCH+NIL | | | | |
| 2 | PDCCH | DUMMY | | | | |
| 1 | PCFICH + NIL | PDCCH+NIL | | | | |
| 0 | DUMMY | PDCCH+NIL | | | | |

FIG.6

DOWNSCALING SYSTEM BANDWIDTH

CROSS REFERENCE TO RELATED APPLICATION

This application addresses subject matter similar to that detailed at co-owned U.S. Provisional Patent Application No. 61/128,341, filed on May 21, 2008 and entitled "Deployment of LTE UL System for Arbitrary System Bandwidths via PUCCH Configuration", the contents of which are hereby incorporated in their entirety.

TECHNICAL FIELD

The teachings herein relate generally to wireless communication systems, methods, apparatus operating in such systems and computer programs for controlling such operations, and the exemplary and non-limiting embodiments relate more specifically to mapping of resource blocks to bandwidth in a way that is compatible with different bandwidth sizes.

BACKGROUND

The following abbreviations and terms are herewith defined:
  3GPP third generation partnership project
  ACK acknowledgement
  CCE control channel element
  DCI downlink control information
  DL downlink eNodeB base station/Node B of an LTE system
  E-UTRAN evolved UTRAN
  FDD frequency division duplex
  HARQ hybrid automatic repeat (or retransmission) request
  LTE long term evolution of 3GPP (also known as 3.9G)
  LTE Rel-8 LTE Release 8 (currently being standardized)
  N_DL_RB number of downlink resource blocks
  N_UL_RB number of uplink resource blocks
  Node B base station or similar network access node
  OFDM orthogonal frequency division multiplex
  PBCH physical broadcast channel
  PCFICH physical control format indicator channel
  PDCCH physical downlink control channel
  PDSCH physical downlink shared channel
  PHICH physical hybrid ARQ indicator channel
  PMCH physical multicast channel
  PRB physical resource block
  SCH synchronization channel (primary p-SCH; secondary s-SCH)
  TDD time division duplex
  UE user equipment (e.g., mobile equipment/station)
  UL uplink
  UMTS universal mobile telecommunications system
  UTRAN UMTS terrestrial radio access network 3GPP is standardizing the long-term evolution (LTE) of the radio-access technology which aims to achieve reduced latency, higher user data rates, improved system capacity and coverage, and reduced cost for the operator. The current understanding of LTE relevant to these teachings may be seen at 3GPP TR 36.213 v8.3.0 (2008-05) entitled PHYSICAL LAYER PROCEDURES (RELEASE 8). Further details of the LTE DL air interface may be seen at TS 36.211 v8.3.0, PHYSICAL CHANNELS AND MODULATION, and also at TS 36.212 v8.3.0, MULTIPLEXING AND CHANNEL CODING (both of which are Release 8).

The LTE DL air interface is based on orthogonal frequency division multiple access using the PDSCH and PMCH data channels, and also PDCCH, PCFICH, PHICH, PBCH, and primary and secondary SCH control channels. The resource mapping of these channel types depends on the downlink system'bandwidth, designated N_DL_RB, which is a configuration parameter in TS 36.211 and represents the available number of DL RBs. Below are summarized resource mapping for those channels.

Resource mapping of PCFICH. The PCFICH broadcasts the number of OFDM symbols used by the PDCCH (e.g., 1, 2, or 3). The PCFICH information consists of 32 bits coded into 16 QPSK (quaternary phase shift keying) modulation symbols which are mapped in the first OFDM symbol of the subframe as 4 symbol quadruplets to 4 equally distant (in the frequency dimension) resource element (RE) groups (of consecutive subcarriers). The position of the 4 RE groups varies with the physical cell identifier such that basically all possible RE group positions can be reached. Further details of the PCFICH resource mapping are specified at TS 36.211 v8.3.0 Section 6.7.4.

If the set of Physical Cell Identifiers is not restricted, the PCFICH in a network practically extends over the complete carrier bandwidth. An example of the resource mapping for 3 MHz bandwidth is shown at FIG. 1, with the PCFICH shown in the $1^{st}$ OFDM symbol position at PRBs 2, 6, 9 and 13. Depending on the physical cell identifier, the four PCFICH portions "move" over the carrier bandwidth.

Resource mapping of PHICH. The PHICH contains the ACK/NAKs for the Uplink HARQ. Multiple PHICHs are grouped into a PHICH group and each PHICH group is mapped in symbol quadruplets to RE groups. Each PHICH group is assigned to a set of 3 Resource Element groups whose positions depend mainly on the DL system bandwidth N_DL_RB, the RE groups already covered by PCFICH, on the PHICH group index, and on the physical cell identifier. The positions of the 3 RE groups are (more or less) equidistant. Consecutive PHICH group indices are mapped to consecutive RE groups. The PHICH may either be mapped to the $1^{st}$ or the first 3 OFDM symbol(s).

If the set of physical cell identifiers is not restricted, this means that the PHICH practically extends over the complete carrier frequency spectrum. Further details of the PHICH mapping are specified at TS 36.211 v8.3.0, Section 6.9.3. An example of the resource mapping for 3 MHz bandwidth is shown in FIG. 1, where one group of PCHICHs is at PRBs 1-3, another group is at PRBs 6-8, and the third group is at PRBs 11-13 (all at the $1^{St}$ OFDM symbol). Depending on the physical cell identifier the three PHICH portions "move" over the carrier bandwidth.

Coding, interleaving, and resource mapping of the PDCCH. The PDCCH contains the UL and DL control information. The PDCCH is built from CCEs and maps (except for resources used by the PCFICH and the PHICH) to the full configured DL system bandwidth N_DL_RB for the $1^{st}$ up to the first 3 OFDM symbols of a subframe. After each PDCCH has been channel-coded and interleaved (as referenced in TS 36.212, see Exhibit C) all PDCCH bits are concatenated and scrambled as a whole with the cell-specific scrambling sequence. Before scrambling the string is filled up with dummy elements (called NIL) to match with the DL system bandwidth (after subtraction of PCFICH and PHICH resources). Then the scrambled sequence is cut into symbol quadruplets which are interleaved in symbol quadruplet granularity first, cyclically shifted depending on the physical cell identity, and then mapped subsequently from the lowest RE group up to the highest RE group. Practically, the PDCCH extends over the complete DL system bandwidth.

Further details of the above resource mappings may be seen at TS 36.211 v8.3.0, TS 36.212 v8.3.0 and TS 36.213 v8.3.0 as referenced above.

While the PBCH and the primary and secondary SCH are centered with respect to the DC carrier using a narrow bandwidth of 6 RBs (shown PRBs 4-9 and spanning OFDM symbols 6-11 at FIG. 1), the PDCCH, the PCFICH and the PHICH extend over the complete DL system bandwidth as configured by N_DL_RB. The PDSCH and the PMCH allocations are controlled by scheduling. Further limitation of PDSCH and PMCH bandwidth beyond the configuration limit N_DL_RB can be vendor-specific and still be compliant with LTE Release 8.

The LTE DL system bandwidth could be flexibly configured if all options for N_DL_RB ranging from 6 RBs up to 110 RBs are supported. However, following the issue of 3GPP TS 36.104 v8.1.0 (2008-03) BASE STATION BS RADIO TRANSMISSION AND RECEPTION and 3GPP TS 36.101 v8.1.0 (2008-03); USER EQUIPMENT UE RADIO TRANSMISSION AND RECEPTION, only selected DL (and UL) system bandwidths are supported by the standard LTE Release 8: for the FDD mode these bandwidths are 1.4 MHz, 3 MHz, 5 MHz, 10 MHz, 15 MHz, and 20 MHz, and are shown along the upper row of FIG. 2. The standardized system bandwidths (both in terms of MHz as well as in terms of the number of active RBs (N_DL_RB) are given in Table 5.1-1 of TS 36.104 v8.1.0, and are shown along the lower row of FIG. 2.

The lower row of FIG. 2 are what the channel mapping is based upon, wherein the active transmission bandwidth is always 180 kHz times the number of PRBs (for example, the 5 MHz transmission bandwidth corresponds to a 4.5 MHz (=25 times 180 KHz) active transmission bandwidth). By 3GPP TS 36.104 and 36.101, manufacturers of equipment operating within a LTE Release 8 system may not fully exploit the available PRBs as long as all 3GPP specifications including the RF specifications in TS 36.104 and TS 36.101 are met such that a standard LTE Release 8 terminal and a standard LTE network can operate fully standard-compliant.

In typical coexistence situations, standardized DL system bandwidths may either lead to violations of emission limits if the selected bandwidth is too wide, or would not fully exploit the available spectrum if the selected bandwidth is too narrow. Despite the coexistence analysis report (3GPP TR 36.942 v1.2.0, 2007-06) as well as conclusive transceiver specifications for UE (TS 36.101 v8.1.0, 2008-03) and for BS (TS 36.104 v8.1.0, 2008-03), many operators face deployment situations where at least the DL system bandwidth they select cannot be matched efficiently by one of the LTE Release 8 standardized system bandwidths.

As noted above, using a standardized DL system bandwidth according to LTE Release 8 that is smaller than the operator's selected bandwidth will drastically reduce spectral efficiency, while using a standardized bandwidth that is larger than the selected bandwidth is simply not possible due to the wireless communication regulator's requirements and emission limits. Arbitrary DL system bandwidths are not supported by the standard. Simply using a combination of smaller bandwidths is seen to drastically reduce spectral efficiency both in DL and UL.

These teachings lead to a more elegant solution to the above problem (described in the following) that is seen to be much more spectrum efficient and also to remain within regulator's emission limits for which the selected bandwidths are tailored.

SUMMARY

According to one exemplary embodiment of the invention is a method that includes determining a first transmission bandwidth and a second bandwidth that is larger than the first transmission bandwidth; fitting the larger second bandwidth to the first transmission bandwidth by blanking physical resource blocks at one or both edges of the larger second bandwidth; transforming a signal to be transmitted using an inverse Fourier transform for the larger second bandwidth for which zeros are applied at the blanked physical resource blocks; filtering the transformed signal to the first transmission bandwidth; and transmitting the transformed and filtered signal over a bandwidth not to exceed the first transmission bandwidth.

According to another exemplary embodiment of the invention is a memory embodying a program of machine readable instructions for performing actions directed to squeezing a larger second bandwidth into a first transmission bandwidth. In this embodiment of the invention the actions include: determining a first transmission bandwidth and a second bandwidth that is larger than the first transmission bandwidth; fitting the larger second bandwidth to the first transmission bandwidth by blanking physical resource blocks at one or both edges of the larger second bandwidth; transforming a signal to be transmitted using an inverse Fourier transform for the larger second bandwidth for which zeros are applied at the blanked physical resource blocks; filtering the transformed signal to the first transmission bandwidth; and transmitting the transformed and filtered signal over a bandwidth not to exceed the first transmission bandwidth.

According to yet another exemplary embodiment of the invention is an apparatus that includes a processor and a transmitter. The processor is configured to fit a larger second bandwidth to a first transmission bandwidth by blanking physical resource blocks at one or both edges of the larger second bandwidth, and to transform a signal to be transmitted using an inverse Fourier transform for the larger second bandwidth for which zeros are applied at the blanked physical resource blocks. The transmitter is configured to filter the transformed signal to the first bandwidth and to transmit the transformed and filtered signal over a bandwidth not to exceed the first bandwidth.

According to still another exemplary embodiment of the invention is a method that includes determining a first transmission bandwidth and a second bandwidth that is larger than the first bandwidth; fitting the larger second bandwidth to the first bandwidth by blanking physical resource blocks at one or both edges of the larger second bandwidth; receiving a signal over a bandwidth that does not exceed the first bandwidth; downconverting and filtering the received signal with respect to the larger second bandwidth; and decoding the downconverted and filtered signal across physical resource blocks of the larger second bandwidth. The excess PRBs are assumed to exist during the decoding, but since at the transmission side they were blanked prior to transmission their presence does not harm the decoding.

According to a further exemplary embodiment of the invention is an apparatus that includes a processor and a receiver. The processor is configured to fit a larger second bandwidth to a first transmission bandwidth by blanking physical resource blocks at one or both edges of the larger second bandwidth. The receiver is configured to receive a signal over a bandwidth that does not exceed the first bandwidth, and to downconvert and filter the received signal with respect to the larger second bandwidth, and to decode the downconverted and filtered signal across physical resource blocks of the larger second bandwidth.

These and other aspects of the invention are detailed below with more particularity.

BRIEF DESCRIPTION OF THE DRAWINGS

The foregoing and other aspects of these teachings are made more evident in the following Detailed Description, when read in conjunction with the attached figures.

FIG. 1 illustrates an exemplary allocation in the $1^{st}$ OFDM symbol of a LTE subframe indicating the resource mapping of the symbol quadruplets of the PDCCH, the PCFICH, and the PHICH, according to the prior art.

FIG. 2 is a table showing both allowable system bandwidths for LTE in terms of MHz (top row) and standardized system bandwidths for LTE Release 8 (bottom row) in terms of active RBs, according to the prior art.

FIG. 5 illustrates an optimized PDCCH, PCFICH, and PHICH resource assignment according to an exemplary embodiment of these teachings.

FIG. 6 shows PRB blanking based on the FIG. 3 optimized assignment according to an exemplary embodiment of these teachings.

DETAILED DESCRIPTION

It is initially noted that the examples and explanations below are in the context of a LTE network/system, but embodiments of this invention are not so limited and may be employed in any network protocol, such as for example UTRAN (universal mobile telecommunications system terrestrial radio access network), GSM (global system for mobile communications), WCDMA (wideband code division multiple access, also known as 3G or UTRAN), WLAN (wireless local area network), WiMAX (worldwide interoperability for microwave access) and the like, in which bandwidth limits in actual use are not integer multiples of bandwidth limits for which mapping rules are designed. Further, the various names used in the description below (e.g., DCI, PDCCH, PRB, etc.) are not intended to be limiting in any respect but rather serve as particularized examples directed to specific LTE implementations using current LTE terms for a clearer understanding of the invention. These terms/names may be later changed in LTE and they may be referred to by other terms/names in different network protocols, and these teachings are readily adapted and extended to such other protocols.

These teachings may be conceptually divided into four areas for ease of explanation, of which the latter three are detail implementations of the first:

Squeezed LTE DL bandwidth within the selected LTE Release 8 bandwidths;

PCFICH and PHICH resource assignments use a limitation to physical cell ID;

PDCCH optimized resource assignment uses a tracking or steering of CCE puncturing; and power boosting on PDCCH affected CCEs.

In general terms, these teachings detail an adjustment of the standard DL system bandwidth to an effective DL system bandwidth smaller than the standard DL system bandwidths (by small multiples of PRBs) in a way that harmonizes with LTE Release-8, and without changing the design of an LTE Release 8 base station/node B or handset/mobile apparatus/terminal. As will be appreciated, these teachings are not limited to only the bandwidths of FIG. 2, as they may in principle be used to map any arbitrary bandwidth to any other arbitrary bandwidth in arbitrary radio access technologies. For purposes of this description, a first bandwidth is the transmission bandwidth that represents the actual physical limits of the bandwidth that will be used in a transmission, whether limited by regulation, hardware/software design, etc.

Figure 3:
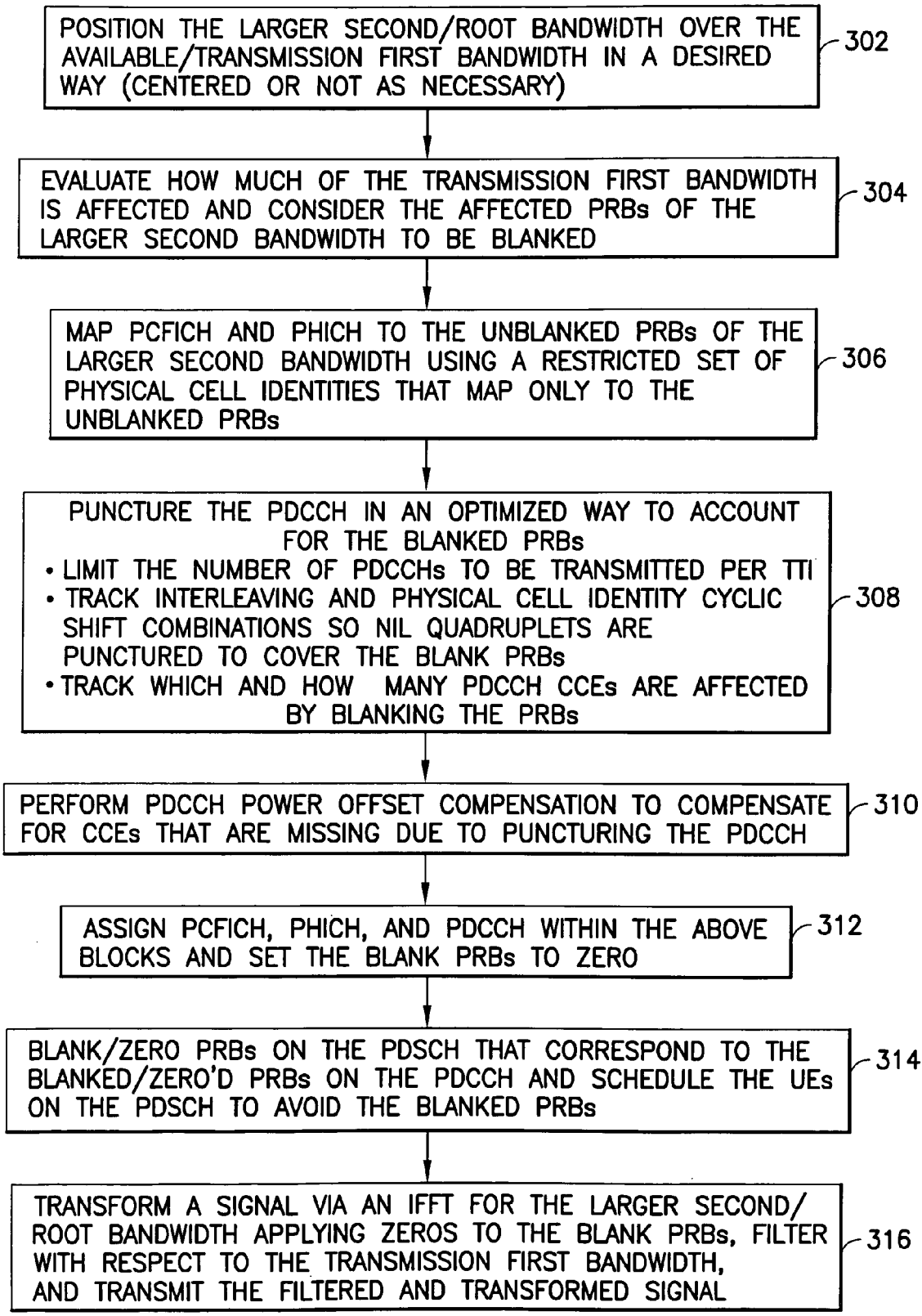
FIG. 3 is a process flow diagram illustrating how to fit the larger second bandwidth to the first transmission bandwidth according to an embodiment of the invention from the transmission side of a wireless communication.

For purposes of explanation, the invention is detailed by way of a non-limiting example according to the process steps of FIG. 3. This example solves the exact problem in LTE detailed in background above. Assume for example that the available spectrum block of 4.4 MHz corresponds to the smaller first bandwidth of 4.4 MHz. Assume that data and control channel design of the standardized 5 MHz (the larger second bandwidth) shall be used within the 4.4 MHz spectrum block. Term the larger second bandwidth (the LTE standardized bandwidth 5 MHz in this example) as the root carrier bandwidth which is targeted by the operator but which in the example exceeds the available spectrum block of 4.4 MHz.

The larger second bandwidth (the standardized LTE DL bandwidth of 5 MHz in this example) is effectively adjusted for use in a narrower spectrum block of 4.4 MHz by positioning the root carrier in a desired way as shown at block 302, which may be either centered with respect to the available first bandwidth or de-centered as necessary. This is a convenience and further implementation details apply equally whether the root bandwidth is centered over the transmission bandwidth or not. "Blanking" PRBs is detailed immediately below. For the specific instance that the root/larger bandwidth is centered over the smaller first bandwidth, there will be a substantially equal number PRBs that are blanked at both edges (high and low frequency edges) of the larger root bandwidth. [As used herein, substantially means within one PRB of the exact center of all the considered PRBs, since in certain instances there will be an odd number of PRBs to be blanked and the best centering of root bandwidth onto the first bandwidth cannot meet an exact center.] For those instances that the root/larger bandwidth is not centered over the smaller first bandwidth, there may be PRBs blanked from either edge or from only one edge of the root bandwidth. Regardless of from which edge or both edges the PRBs are to be blanked, the proper amount/number of PRBs are determined first.

In order to determine how many PRBs to blank, next evaluate at block 304 how much of the second larger bandwidth is affected due to the operator's spectrum block size (being the smaller first bandwidth) and how many PRBs on one or two sides are affected; those affected PRBs shall be "blanked" later. These PRBs are now termed blank PRBs or blanked PRBs. Consider the example set forth above. For a centered positioning of the root carrier, 50 KHz at the left and 50 KHz at the right edge of the active transmission bandwidth (i.e. 1 PRB per edge) are affected. For an ultimately de-centered positioning of the root carrier, 350 KHz of the active transmission bandwidth are affected which again corresponds to 2 PRBs but this time they would both be on one side of the larger root bandwidth.

If the active transmission bandwidth is not affected, then optimizing channel assignment as detailed immediately below and the power boosting detailed thereafter need not be done, and the IFFT may be applied as described below (block 316 of FIG. 3).

The PCFICH, PHICH, and PDCCH assignment is optimized for the first transmission bandwidth (4.4 MHz in the example) as follows. First, limit the set of physical cell identifiers for optimizing PCFICH and PHICH assignment. Recall from the background above that in LTE the PCFICH and PHICH are mapped in dependence on the physical cell identity, and the PDCCH is cyclically shifted according to the physical cell identity. According to this aspect of the invention, we limit the number of physical cell identities that are allowed for use in this network to a restricted set of physical cell identities that lead to such PCFICH positions as well as PHICH (group) positions that avoid the blank PRBs. Since from FIG. 2 the selected bandwidths and the standard bandwidths are known in advance, the blank PRBs are known in advance for every reasonable fitting of standard bandwidth to selected bandwidth. Restricting the set of physical cell identities is generally possible because the PCFICH and the PHICH groups move in the same direction over the carrier bandwidth, and because for rather large bandwidths the amount of positions allowing for blank PRBs can be assumed to be sufficiently large. If there are many PHICH groups to be assigned, the "extended PHICH" option may be used as it relaxes the constraints on the physical cell identities that would be candidates for the restricted set. This may be implemented in two ways. The base station/Node B and/or the UE can store a pre-defined list of the restricted set of physical cell identities which would have been determined a priori using the fitting required, or those apparatus may determine the restricted set themselves based on an exhaustive analysis of how the PCFICH and PHICH groups map to the PRBs so as to avoid the blanked ones. However implemented, the PCFICH and PHICH are mapped at block 306 to the unblanked PRBs of the larger second bandwidth using the restricted set of physical cell identities.

Next at block 308 of FIG. 3, puncture the PDCCH in an optimized way to account for the blanked PRBs. First, the number of PDCCHs to be transmitted per TTI is limited by the scheduler such that (if necessary with a maximum 3 OFDM symbol PDCCH configuration) sufficient NIL quadruplets enter the PDCCH strings. Second, by tracking the interleaving and physical cell identity cyclic shift combinations, as many as possible NIL quadruplets come to reside on blank PRBs Third, which and how many PDCCH CCEs are affected by blanking the PRBs is tracked as will be seen below.

In effect the PDCCH is punctured by not sending the blank PRBs. By placing the NILs at the puncturing positions that align with the blanked PRBs after interleaving and cyclically shifting the PDCCH assures that valid control information is not placed in those blank PRBs that are not sent.

If still not all blank PRBs contain NILs, puncturing complete RE groups is not seen to introduce burst errors into the turbo (convolutional) coder, since two different interleaving steps (bit-level as well as quadruplet-level) will spread the PDCCH information over the bandwidth and help avoid frequency-selective interference.

If still not all blank PRBs contain NILs, power boosting can be applied to the PDCCH RE groups affected by puncturing. At block 310 of FIG. 3 there is performed PDCCH power offset compensation for the PDCCH scheduling, in order to compensate for missing information within the RE groups that were tracked above in the PDCCH puncturing step. Since these RE groups are missing due to being punctured, the power compensation due to the puncturing will always be a power boost to the PDCCH. Power compensation can be precision implemented based on the CCE and/or RE group isolation algorithm which shows how many resource element groups are missing from each CCE due to blanking, or it could be more generic such as a statistical offset that is introduced as a 'penalty' without regard to how many CCEs or RE groups are actually punctured. Such a statistical offset would most relevantly be tailored to the specific bandwidth sizes being considered, but since interleaving differs in different scenarios the offset applied from the statistical model would only approximate the number of CCEs that were blanked in fact. Further, as another example of power boosting, the power boosting algorithm could be allocating resources for each PDCCH assuming no puncturing, and then apply the transmit restriction mask to match the transmit restrictions. Following this, it would be a simple task to identify the RE groups and corresponding CCEs that are being punctured. With this knowledge it is relative simple to calculate the needed power boosting for the punctured PDCCHs.

Now finally at block 312 of FIG. 3 the PCFICH, PHICH, and PDCCH are assigned within the constraints set forth above, and the blank PRBs are set to zero. As of yet though it is only the control channels that have been mapped. To complete the fitting of the larger bandwidth to the smaller transmission bandwidth, next at block 314 the same PRBs on the PDSCH are blanked as were zeroed on the PDCCH, and schedule the UEs on the PDSCH to avoid the blanked PRBs.

Now finally information is ready to be sent. An inverse (fast) Fourier transform (IFFT) is executed on a signal to be transmitted but the IFFT is related to the root/larger bandwidth. To fit that 1FFT to the first bandwidth, at block 316 of FIG. 3 we apply zeros in the IFFT to the blank PRBs, and transmit that transformed signal with an optimized RF solution that filters with respect to the available, first bandwidth (of 4.4 MHz in his example).

Figure 4:
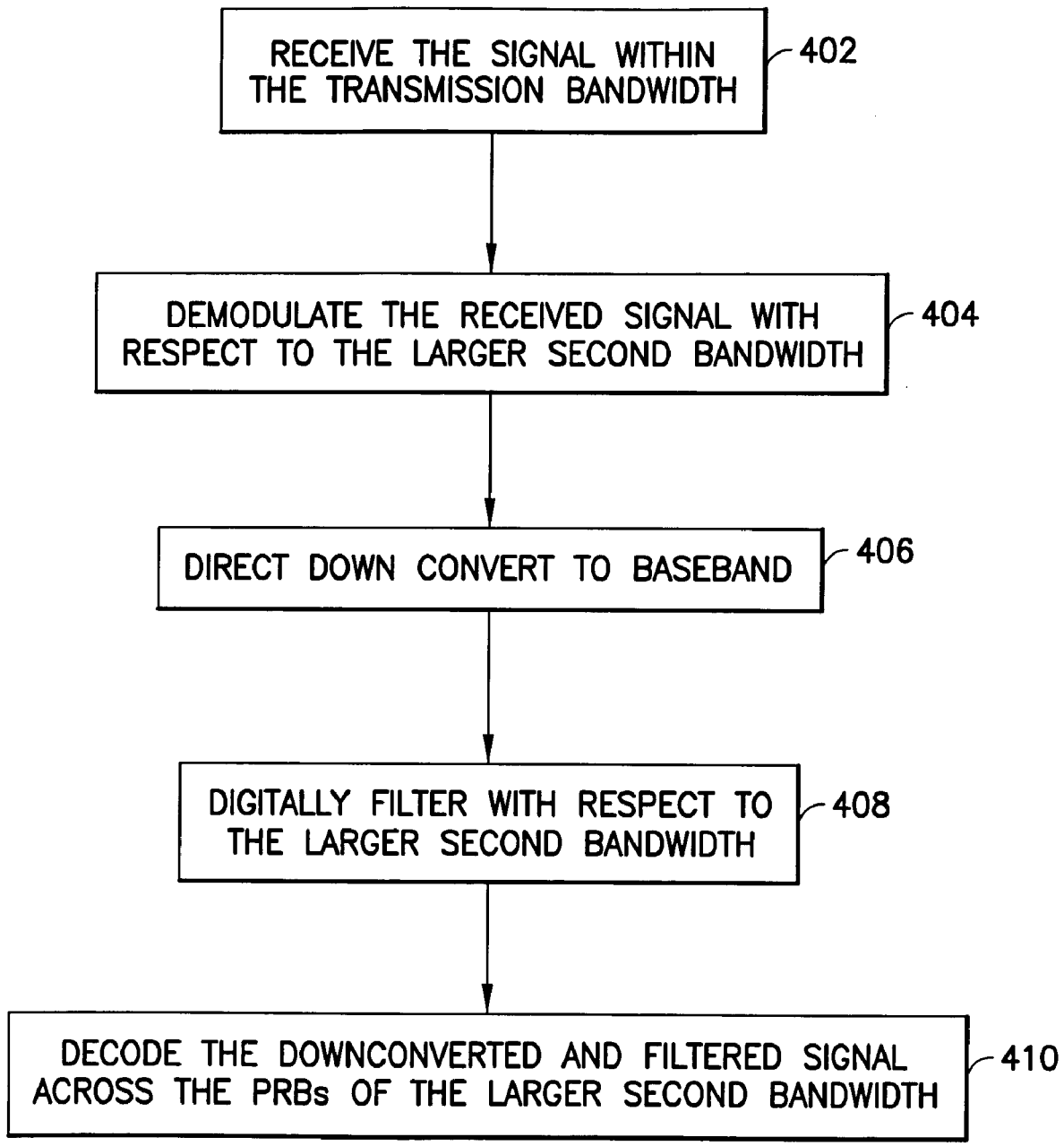
FIG. 4 is similar to FIG. 3 but from the reception side of a wireless communication

Of course the above description is from the perspective of the Node B, as in the LIE system it is the NodeB that does the scheduling of UEs. From the perspective of the UE, the first few steps are similar as those detailed above for fitting the bandwidths and mapping the control channels and blanking the PRBs. Further operation of the UE is shown at FIG. 4. Once the UE receives the signal (block 402) from the NodeB, the UE demodulates (block 404) with respect to the larger second/root bandwidth (e.g., 5 MHz in this example). After direct down conversion to 20 MHz in the baseband (block 406), the UE digitally filters at block 408, also with respect to the larger second/root bandwidth (in this example 5 MHz). This leads to potentially high interference levels on the blank PRBs. It is true that interference on the blank PRBs affects the decoding of the PDCCH. If the bandwidth adjustment (in particular with respect to the active transmission bandwidth) is kept relatively small and the above described assignment optimizations have been performed, the error probability on PDCCH decoding can be kept sufficiently low despite the high interference. The PCFICH is not affected by interference on blank PRBs, and the PHICH is not affected by the interference on the blank PRBs. And so the UE decodes the down-converted and filtered signal across the PRBs of the larger second/root bandwidth (block 408).

Applying the above process, the DL system bandwidth effectively has been reduced to a smaller bandwidth (4.14 MHz active transmission bandwidth for the 4.4 MHz spectrum block instead of 4.5 MHz active transmission bandwidth of the 5 MHz standard transmission bandwidth in this example) that is harmonized with the LTE Release 8 standard. The advantage of this approach is that standard LTE Release 8 mobile terminals/UEs, including roamers—i.e. users/terminals/mobiles subscribed to an operator other than the one that would deploy e.g. 5 MHz squeezed into 4.4 MHz—are supported in a system with adjusted (squeezed) LTE DL system bandwidth. Performance degradations can be controlled and may be accepted if the benefits are higher spectral efficiency and higher user peak rates compared to using a smaller standardized bandwidth (e.g. 3 MHz+1.4 MHz in this example).

FIGS. 5 and 6 illustrate the adjustment and implementation as described above. The configuration of FIG. 5 uses minimized puncturing on PDCCH: either a DUMMY or PDCCH+NIL is assigned to the outer PRBs, and the positioning of the PCFICH and PHICH is optimized in that neither is on the outer PRBs.—as well as with one example of an optimized positioning of PCFICH (PRBs 1, 7, 13 and 20) and PHICH (PRBs 11-12 in the $1^{st}$ OFDM symbol, PRBs 3-4 in the $2^{nd}$, and PRBs 20-21 in the $3^{rd}$) in that none are mapped to an outer PRB.

FIG. 6 shows the squeezed LTE DL system bandwidth based on FIG. 5, but with optimized assignment by blanking the two outmost PRBs and reducing the transmission bandwidth of originally 4.5 MHz reduced down to 4.14 MHz.

Figure 7:
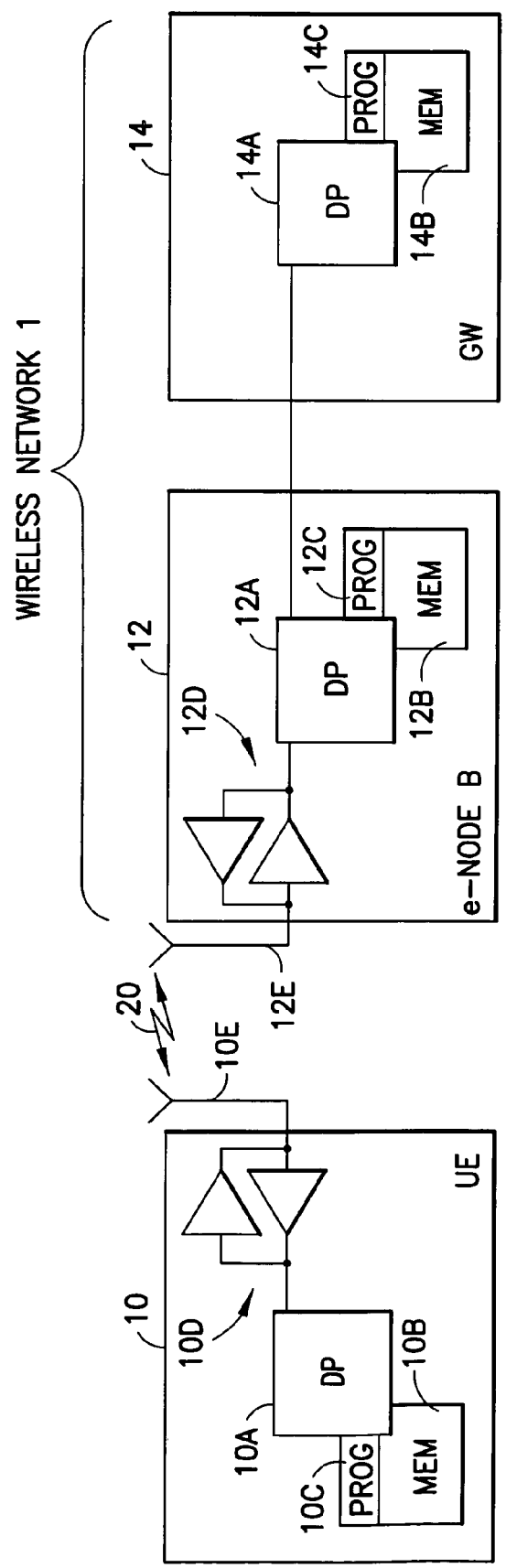
FIG. 7 shows a simplified block diagram of various electronic devices that are suitable for use in practicing the exemplary embodiments of this invention.

Reference is now made to FIG. 7 for illustrating a simplified block diagram of various electronic devices that are suitable for use in practicing the exemplary embodiments of this invention. In FIG. 7 a wireless network 1 is adapted for communication between a UE 10 and a Node B 12 (e-Node B). The network 1 may include a gateway GW/serving mobility entity MME/radio network controller RNC 14 or other radio controller function known by various terms in different wireless communication systems. The UE 10 includes a digital processor (DP) 10A, a memory (MEM) 10B that stores a program (PROG) 10C, and a suitable radio frequency (RF) transceiver 10D coupled to one or more antennas 10E (one shown) for bidirectional wireless communications over one or more wireless links 20 with the Node B 12. It is understood that the various RF functions such as demodulating, downconverting, filtering and decoding are performed typically in the radio front end represented in FIG. 7 as the transceivers 10D, 12D, though certain functions may be implemented in the illustrated processors 10A, 12A.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The Node B 12 also includes a DP 12A, a MEM 12B, that stores a PROG 12C, and a suitable RF transceiver 12D coupled to one or more antennas 12E. The Node B 12 may be coupled via a data path 30 (e.g., Iub or S1 interface) to the serving or other GW/MME/RNC 14. The GW/MME/RNC 14 includes a DP 14A, a MEM 14B that stores a PROG 14C, and a suitable modem and/or transceiver (not shown) for communication with the Node B 12 over the Iub link 30.

Also within the Node B 12 is a scheduler (e.g., a scheduling function within the processor 12A) that schedules the various UEs under its control for the various UL and DL subframes. Once scheduled, the Node B sends messages to the UEs with the scheduling grants (typically multiplexing grants for multiple UEs in one message). These grants are sent over the particular channels noted with the specific embodiments detailed above. Generally, the Node B 12 of an LTE system is fairly autonomous in its scheduling and need not coordinate with the GW/MME 14 excepting during handover of one of its UEs to another Node B.

At least one of the PROGs 10C, 12C and 14C is assumed to include program instructions that, when executed by the associated DP, enable the electronic device to operate in accordance with the exemplary embodiments of this invention, as detailed above. Inherent in the DPs 10A, 12A, and 214A is a clock to enable synchronism among the various apparatus for transmissions and receptions within the appropriate time intervals and slots required, as the scheduling grants and the granted resources/subframes are time dependent.

The PROGs 10C, 12C, 14C may be embodied in software, firmware and/or hardware, as is appropriate. In general, the exemplary embodiments of this invention may be implemented by computer software stored in the MEM 10B and executable by the DP 10A of the UE 10 and similar for the other MEM 12B and DP 12A of the Node B 12, or by hardware, or by a combination of software and/or firmware and hardware in any or all of the devices shown.

In general, the various embodiments of the UE 10 can include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B and 14B may be of any type suitable to the local technical environment and may be implemented using any suitable data storage technology, such as semiconductor-based memory devices, magnetic memory devices and systems, optical memory devices and systems, fixed memory and removable memory. The DPs 10A, 12A and 14A may be of any type suitable to the local technical environment, and may include one or more of general purpose computers, special purpose computers, microprocessors, digital signal processors (DSPs) and processors based on a multi-core processor architecture, as non-limiting examples.

For the aspects of this invention related to the network, embodiments of this invention may be implemented by computer software executable by a data processor of the eNodeB 12, such as the processor 12A shown, or by hardware, or by a combination of software and hardware. For the aspects of this invention related to the portable devices accessing the network, embodiments of this invention may be implemented by computer software executable by a data processor of the UE 10, such as the processor 10A shown, or by hardware, or by a combination of software and hardware. Further in this regard it should be noted that the various logical step descriptions above may represent program steps, or interconnected logic circuits, blocks and functions, or a combination of program steps and logic circuits, blocks and functions.

In general, the various embodiments may be implemented in hardware or special purpose circuits, software (computer readable instructions embodied on a computer readable medium), logic circuits or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules, for which FIGS. 3-4 may be considered as representing functional blocks of such an integrated circuit. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope of the invention as set forth above, or from the scope of the ensuing claims.

We claim:

1. A method comprising:
   an apparatus fitting a larger system bandwidth to a smaller transmission bandwidth by blanking Physical resource blocks at one or both edges of the larger system bandwidth;
   after fitting the larger system bandwidth, the apparatus mapping a first set of control channels to only unblanked physical resource blocks of the larger system bandwidth by using a restricted set of physical cell identities that map only to the unblanked physical resource blocks, in which each control channel of the first set maps in dependence on a physical cell identity;
   the apparatus transforming a signal to be transmitted using an inverse Fourier transform for the larger system bandwidth for which zeros are applied at the blanked physical resource blocks;
   the apparatus filtering the transformed signal to the smaller transmission bandwidth; and
   the apparatus transmitting the transformed and filtered signal over a bandwidth not to exceed the smaller transmission bandwidth.

2. The method of claim 1, wherein the first set of control channels comprise physical control format indicator channel and physical hybrid automatic repeat request indicator channel.

3. The method of claim 1, further comprising puncturing a second control channel, which is cyclically shifted according to a physical cell identity of the restricted set, such that the puncturing falls on the blanked physical resource blocks.

4. The method of claim 3, wherein the second control channel comprises a physical downlink control channel and puncturing further comprises tracking combinations of interleaving and cyclic shifts according to physical cell identities of the restricted set such that the puncturing falls on the blanked physical resource blocks after interleaving and cyclic shifting of the physical downlink control channel.

5. The method of claim 4, further comprising, after puncturing the second control channel, power compensating the second control channel for control channel elements that were removed from the second control channel due to the puncturing.

6. The method of claim 5, further comprising, after power compensating, assigning the first set of control channels and the second control channel and setting the blank physical resource blocks to zero.

7. The method of claim 6, further comprising blanking physical resource blocks on a shared channel that correspond to the physical resource blocks that were set to zero and scheduling a plurality of user equipments on the shared channel so as to avoid the blanked physical resource blocks on the shared channel.

8. The method of claim 1, wherein the larger system bandwidth is constrained to be selected from the group consisting of 6, 15, 25, 50, 75, and 100 active resource blocks.

9. The method of claim 1, in which the apparatus comprises a network node operating within an E-UTRAN system.

10. A data storage memory device embodying a program of computer readable instructions which when executed by at least one processor result in actions comprising:
    fitting a larger system bandwidth to a smaller transmission bandwidth by blanking physical resource blocks at one or both edges of the larger system bandwidth;
    after fitting the larger system bandwidth, mapping a first set of control channels to only unblanked physical resource blocks of the larger system bandwidth by using a restricted set of physical cell identities that map only to the unblanked physical resource blocks, in which each control channel of the first set maps in dependence on a physical cell identity;
    transforming a signal to be transmitted using an inverse Fourier transform for the larger system bandwidth for which zeros are applied at the blanked physical resource blocks;
    filtering the transformed signal to the smaller transmission bandwidth; and
    transmitting the transformed and filtered signal over a bandwidth not to exceed the smaller transmission bandwidth.

11. The data storage memory device of claim 10, the actions further comprising puncturing a second control channel, which is cyclically shifted according to a physical cell identity of the restricted set, such that the puncturing falls on the blanked physical resource blocks.

12. An apparatus comprising:
    a processor configured to fit a larger system bandwidth to a smaller transmission bandwidth by blanking physical resource blocks at one or both edges of the larger system bandwidth, and to transform a signal to be transmitted using an inverse Fourier transform for the larger system bandwidth for which zeros are applied at the blanked physical resource blocks;
    the processor further configured, after fitting the larger system bandwidth, to map a first set of control channels to only unblanked physical resource blocks of the larger system bandwidth by using a restricted set of physical cell identities that map only to the unblanked physical resource blocks, in which each control channel of the first set maps in dependence on a physical cell identity; and a transmitter configured to filter the transformed signal to the smaller transmission bandwidth and to transmit the transformed and filtered signal over a bandwidth not to exceed the smaller transmission bandwidth.

13. The apparatus of claim 12, wherein the first set of control channels comprise physical control format indicator channel and physical hybrid automatic repeat request indicator channel.

14. The apparatus of claim 12, wherein the processor is further configured to puncture a second control channel, which is cyclically shifted according to a physical cell identity of the restricted set, such that the puncturing falls on the blanked physical resource blocks.

15. The apparatus of claim 14, wherein the second control channel comprises a physical downlink control channel and the processor is further configured, while puncturing, to track combinations of interleaving and cyclic shifts according to physical cell identities of the restricted set such that the puncturing falls on the blanked physical resource blocks after interleaving and cyclic shifting of the physical downlink control channel.

16. The apparatus of claim 15, wherein the processor is further configured, after puncturing the second control channel, to power compensate the second control channel for control channel elements that were removed from the second control channel due to the puncturing.

17. The apparatus of claim 16, wherein the processor is further configured, after the power compensating, to assign the first set of control channels and the second control channel and to set the blank physical resource blocks to zero.

18. The apparatus of claim 17, wherein the processor is further configured to blank physical resource blocks on a shared channel that correspond to the physical resource blocks that were set to zero and to schedule a plurality of user equipments on the shared channel so as to avoid the blanked physical resource blocks on the shared channel.

19. The apparatus of claim 12, wherein processor is constrained to select the larger system bandwidth from the group consisting of: 6, 15, 25, 50, 75, and 100 active resource blocks.

20. The apparatus of claim 12, wherein the apparatus comprise a network node operating within an E-UTRAN system.

* * * * *